(12) United States Patent
Lange

(10) Patent No.: US 7,179,386 B2
(45) Date of Patent: Feb. 20, 2007

(54) DISCHARGING SAND FROM A VESSEL AT ELEVATED PRESSURE

(75) Inventor: Neville Ernest Lange, Gloucester (GB)

(73) Assignee: Axsia Serck Baker Limited, Gloucester (GB)

( * ) Notice: Subject to any disclaimer, the term of this patent is extended or adjusted under 35 U.S.C. 154(b) by 483 days.

(21) Appl. No.: 10/479,470

(22) PCT Filed: May 27, 2002

(86) PCT No.: PCT/GB02/02471

§ 371 (c)(1),
(2), (4) Date: Dec. 2, 2003

(87) PCT Pub. No.: WO02/099249

PCT Pub. Date: Dec. 12, 2002

(65) Prior Publication Data

US 2004/0182754 A1 Sep. 23, 2004

(30) Foreign Application Priority Data

Jun. 4, 2001 (GB) .................... 0113499.8
Jul. 7, 2001 (GB) .................... 0116687.5

(51) Int. Cl.
*B01D 21/26* (2006.01)

(52) U.S. Cl. .............. 210/739; 210/788; 210/806; 210/198.1; 210/205; 210/206; 210/416.1; 210/512.2; 209/726; 209/729

(58) Field of Classification Search .............. 210/739, 210/788, 806, 198.1, 205, 206, 416.1, 512.2; 209/726, 729

See application file for complete search history.

(56) References Cited

U.S. PATENT DOCUMENTS

| 5,853,266 A | 12/1998 | Parkinson et al. |
| 6,119,870 A | 9/2000 | Cymerman et al. |
| 6,315,837 B1 | 11/2001 | Barclay |

FOREIGN PATENT DOCUMENTS

| CA | 2 200899 | 9/1998 |
| GB | 2 293 992 | 4/1996 |
| GB | 2 296 106 | 6/1996 |
| WO | WO 99 38617 | 8/1999 |

*Primary Examiner*—David A. Reifsnyder
(74) *Attorney, Agent, or Firm*—Young & Thompson

(57) ABSTRACT

Sand is discharged from a vessel at an elevated pressure and is delivered at a lower pressure. The sand is subjected to the following steps before delivery: I) dilution with a dilution fluid, ii) passage through at least one pressure reducing cyclone, the dilution being such that flashing is reduced, and iii) delivery as a slurry at the delivery pressure. This results in less wear of the components.

18 Claims, 1 Drawing Sheet

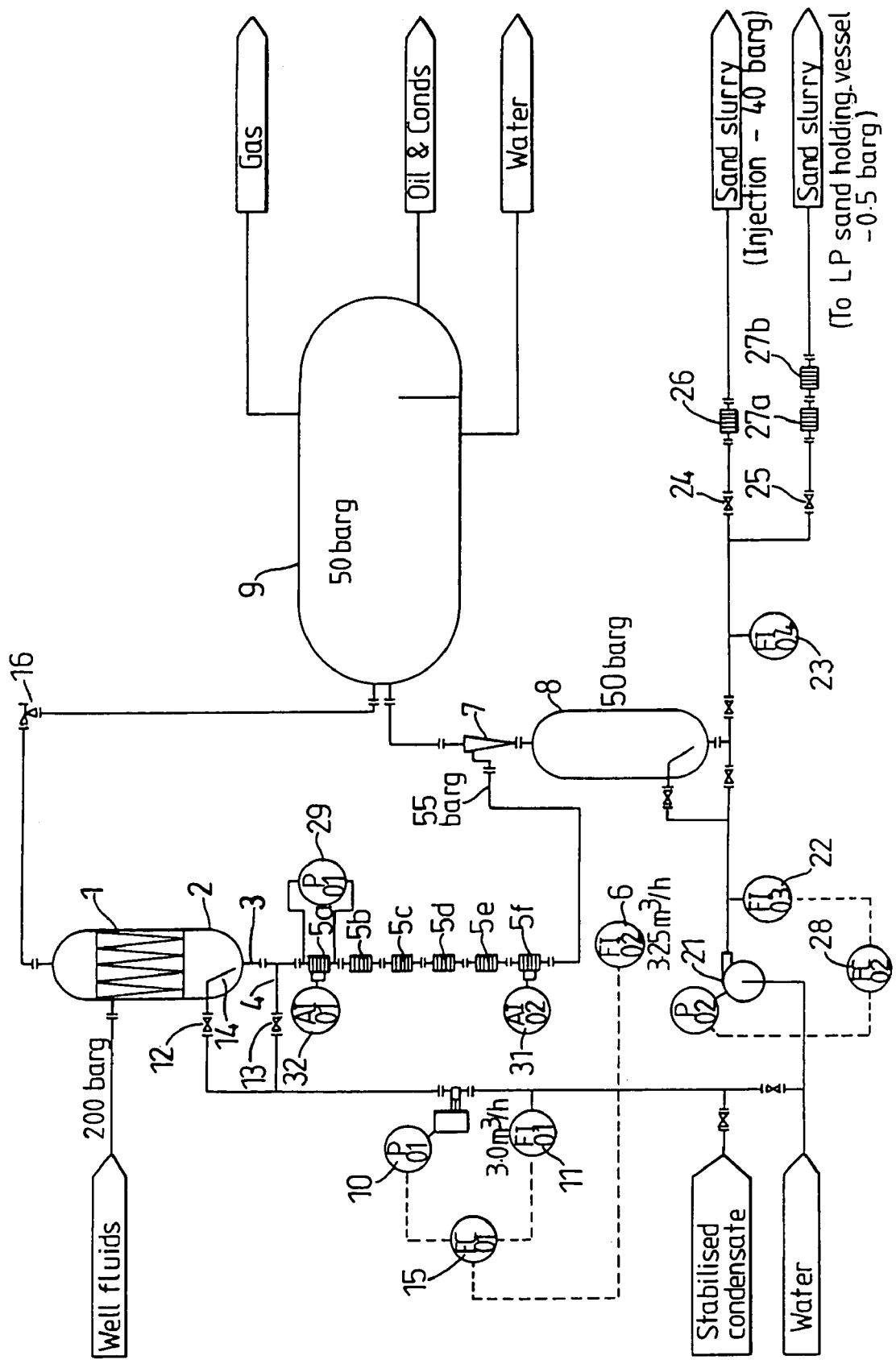

DISCHARGING SAND FROM A VESSEL AT ELEVATED PRESSURE

BACKGROUND OF THE INVENTION

The present invention relates to discharging sand from a vessel.

The fluids produced by an oil or gas well are gas, oil (or gas condensate) and water. The fluids can also contain solid particles which can be material from the reservoir, scales formed by the water and corrosion products, proppant/frac sand and materials from other sources all of which will be referred to collectively as sand. The flowrate of fluids from a well is controlled by a valve commonly referred to as the wellhead choke valve. The wellhead pressure can be quite high, 200 barg or more, particularly in wells where a large proportion of the fluids is gas and the wellhead choke valve can be required to drop the greater proportion of this pressure. In some cases where solids are present in the well fluids, the wearing parts of wellhead choke valves have a life of a few weeks or less before they must be replaced.

The sand that is present in well fluids is detrimental to the oil and gas production operations. Some of the major effects of the sand are that it increases wear on pumps, valves and other pipeline equipment, damages or cause instrumentation to give incorrect readings, it occupies volume in separator vessels reducing the efficiency of separation taking place in the vessels, and if present in the oil it reduce its quality and value. Strategies and techniques have been developed to cope with sand in the oil production equipment, but these generally have an economic penalty, because they make the production equipment more costly, reduce its capacity, and require greater levels of manning for its operation and maintenance. There are oil and gas reservoirs which are not in production because the cost of coping with the expected sand production make them uneconomic.

The sand entrained in the wellhead fluids is a waste by product which has to be disposed of. In the past such produced sand on offshore oil production platforms has been allowed to be disposed of into the sea. National legislation in a number of the oil producing areas of the world is heading towards a "zero discharge" concept where any such sand is not permitted to be disposed of in the sea. Some options available for disposal are to inject the sand into a permeable strata below the seabed, or to clean it and bring it to shore to be disposed of in landfills. For sands produced in land based oil production in "zero discharge" areas the disposal options are the same.

It is possible to construct the well in a fashion to retain or filter out such sand so that it does not come to the surface. This is done in some instances but it can have the side effect of reducing the fluid production rate. It is also known for these wells to be constructed incorrectly or for the filters installed in the wells to fail, and so the sand is still produced.

Where an oil and gas production well will produce sand, it is beneficial to remove the sand as early in the oil and gas production process as possible to reduce the costs and other penalties associated with having to use sand tolerant downstream equipment. Effective sand removal equipment can potentially allow oil and gas to be economically extracted from fields which will produce what are currently considered to be unmanageable quantities of sand.

There are now a number of oil and gas wells where hydrocyclones have been installed to remove produced sand upstream of the wellhead choke. When installed in this location the hydrocyclones have been termed wellhead desanders. Hydrocyclones are also fitted to the water streams from production separators where they are termed produced water desanders, but clearly they can be fitted to any stream containing sand where it is desired to remove the sand. For subsequent discussion all such hydrocyclone equipment for these duties shall be referred to as desanders. The common arrangement of a desander is for one or more cyclones to be installed into a vessel designed to contain the maximum design pressure of the system. Within the vessel there are what are referred to as tubeplates which seal to the vessel internal walls and to the cyclones so as to form three chambers within the vessel between which fluid can only flow by passing through the one or more cyclones. The three compartments are referred to as the inlet compartment, the overflow compartment and the underflow compartment, and they communicate respectively with the inlet, overflow and underflow ports of the one or more cyclones. These desanders are generally operated with no net flow from the underflow compartment. In this arrangement slurry flows into the underflow compartment through the outer annular area of the underflow port of the cyclone and the fluid that is displaced from the underflow compartment by the slurry flows back into the cyclone through the central area of the underflow port. Periodically, and before it becomes too full, the sand collected in the underflow compartment must be removed.

Where the desander is operating at a low pressure, say up to 10 barg, the sand may be discharged simply by opening a valve in piping connected from the lowest point of the underflow compartment to a slurry receiving vessel at atmospheric pressure and allowing the pressure in the underflow compartment to push the sand out as a slurry formed with the liquid phases. Jets of liquid or specifically designed devices inserted into the underflow compartment may be used to encourage the formation of the sand slurry. One such device is described in U.S. Pat. No. 5,853,266. The problem with this method of discharge is that the pressure of the slurry must be reduced by the valve or other pipeline components as it passes between the underflow compartment and the receiving vessel. The best types of valves for dropping the pressure of flows of slurry are diaphram valves or pinch valves. These valves have elastomer elements contacting the flow, and even these valves have a relatively short life in this duty. The pressure limitation of this type of system arises from the elastomer elements within the valves because they form part of the pressure containing envelope of the valve and are not suitable for higher pressures. Additionally, dropping larger pressures across these valves would also further reduce their life.

Where the desander is operated at higher pressures it is common to provide a separate vessel known as a sand accumulator into which the sand from the desander can collect, with at least one valve being located between the desander and the accumulator. When the sand accumulator is collecting sand from the desander all other outlets and inlets from it are normally closed so that there is no net flow from the vessel and it operates as an extension of the closed underflow compartment described previously. When discharge of the sand is required from the sand accumulator, the valve between the desander and the accumulator is closed and then the accumulator is depressurised to a lower pressure near to that of the vessel into which the sand will be received. In this way the pressure which must be dropped as the sand flows as a slurry between the accumulator and the receiving vessel is reduced to within the capabilities of the valves and other pipeline components. This system design has a number of problems:

1. The sand accumulator may only be able to be discharged a certain number of times due to fatigue caused by the necessary depressurisation and pressurisation cycles.
2. The batch nature of the discharge process means that the valves are operated frequently, and their operation may need to be automated.
3. The valves fitted to the accumulator vessel are required to isolate a flow of slurry, for which they are generally not ideally suited, and hence their life is reduced and their maintenance requirements are increased.
4. It may be required that the ports through which fluids flow into or out of the sand accumulator must be fitted with two valves in series with a third valve venting the piping between the two valves to provide satisfactory isolation of pressure. This increases the number of valves which increases the cost, size, weight, and maintenance requirements of the system.
5. Stopping and starting the flow of a slurry increase the chances of a blockage occurring in slurry lines. While the chances of this occurring are not necessarily increased when compared to the lower pressure system described above, it can be more difficult and time consuming to clear blockages in a higher pressure system because the valves and piping are more difficult to dis-assemble and re-assemble, and greater safety precautions must be taken.

The pressure of a flow of slurry may also be reduced by passing the flow through one or more hydrocyclones. In a hydrocyclone pressure drop is produced by pushing the flow of slurry inward from the outer diameter where it is introduced tangentially, towards the axial centerline of the cyclone from where it is removed, against the radial acceleration field produced by the circular motion of the fluid. Typically the maximum velocity of the fluid in a hydrocyclone is one tenth that in a valve dropping the same pressure, and this along with the ability to make cyclones in highly wear resistant materials allows a hydrocyclone to have a much greater life than a valve. A hydrocyclone apparatus specifically designed for this purpose is described in GB 2,296,106A. As an example an apparatus as described in GB 2,296,106A has been installed in an offshore oil platform where it is dropping a flow of slurry of 3 m$^3$/h through a pressure of 26 bar from a desander accumulator vessel. The device operates intermittently, but regardless of this has passed the same amount of sand as it would have if it had run continuously, and has achieved a wear life of nearly 2 years. Cyclones used for dropping pressure shall be subsequently referred to as pressure dropping cyclones.

The use of pressure dropping cyclones to drop the pressure of a slurry allows the design of desanders with either a continuous discharge or intermittent discharge without depressurising of sand accumulators to be considered. The problem with such systems is that if gas or a flashing liquid (a liquid that releases dissolved gas on pressure reduction) conveys the sand, the rate of wear increases because of the higher velocities in the cyclone.

WO99/38617 discloses a method of delivering slurry or sand slurry which is diluted with a dilution fluid and then passes through pressure-reducing cyclones.

SUMMARY OF THE INVENTION

The objective of this invention is to overcome the problem described above to extend the operational life of pressure dropping cyclones used to drop the pressure of a flow of slurry from a pressurised sand accumulation vessel, or any other vessel containing sand which operates at an elevated pressure.

According to a first aspect of the present invention there is provided a method of delivering sand slurry originating from sand or sand slurry discharged from a vessel at a discharge pressure, wherein the sand or slurry is subjected to the following steps before delivery at a delivery pressure, the delivery pressure being lower than the discharge pressure:
   i) dilution with a dilution fluid,
   ii) passage through at least one pressure reducing cyclone, the dilution being such that flashing (as defined) is reduced, and
   iii) delivery as a slurry at the delivery pressure.

The method may further include a step prior to step iii) of delivering the sand slurry at a pressure lower than the discharge pressure to a separator which removes at least some of the dilution fluid. Steps i) and ii) may be repeated if desired, and the step involving the separator may be also be repeated.

The vessel may include a desander vessel having an underflow compartment. In this case the method may further including a step of adding dilution fluid to the sand in the underflow compartment.

The ratio of dilution fluid to the sand or sand slurry being discharged may be approximately 12:1, although different ratios may be used depending upon individual circumstances.

The at least one pressure reducing cyclone may reduce the pressure of the sand slurry passing therethrough by 25%–30%, although again it will be understood that this range is exemplary only.

The flow rate of the dilution fluid being added to the sand at step i) can be lower than the flow rate of the sand slurry prior to its delivery at step iii).

The method can further include steps of:
detecting flashing within one or more of the pressure reducing cyclones, and
increasing the flow rate of the dilution fluid at step i) if flashing is detected.

The method can further include steps of:
detecting gas entering the pressure reducing cyclone or the first one of more than one of the cyclones, and
increasing the flow rate of the dilution fluid at step i) if gas is detected.

The dilution fluid may include degassed produced water or a hydrocarbon liquid.

In one embodiment, the slurry is discharged at step iii) into a holding vessel so that it can be stored temporarily.

According to a second aspect of the present invention there is provided apparatus for delivering sand slurry originating from sand or sand slurry discharged from a vessel at a discharge pressure, the sand slurry being delivered at a delivery pressure lower than the discharge pressure, the apparatus including:
a diluting component for combining the sand or sand slurry with a dilution fluid, and
at least one pressure reducing cyclone downstream of the diluting component,
wherein the diluting component is controlled by a flow controller for controlling the amount of the dilution fluid combined with the sand or sand slurry such that flashing is reduced.

The separator of the apparatus can include a hydrocyclone.

BRIEF DESCRIPTION OF THE DRAWING

For a better understanding of the invention one example will now be described, with reference to the accompanying drawing which is a circuit diagram of a system for discharging sand from a vessel at elevated pressure.

DESCRIPTION OF THE PREFERRED EMBODIMENTS

A wellhead desander vessel 1 receives well fluids from a well at a pressure of 200 barg so as to remove sand from the fluid prior to it entering the wellhead choke valve 16. Sand is separated from the fluids and accumulates within the underflow compartment 2 within the vessel 1. The sand and a small quantity of fluid from the underflow compartment 2 passes out of the desander vessel 1 through an outlet 3 where it combines with dilution fluid fed from a pipe 4 before entering a series of pressure reducing cyclones 5a to 5f where its pressure drops from approximately 200 barg to 55 barg. From the outlet of the last pressure reducing cyclone 5f the slurry flows through flowmeter 6 and then enters hydrocyclone 7 at a pressure of 55 barg where the sand is separated into sand holding vessel 8 operating at 50 barg and the liquid into another vessel 9 (in this example a production separator) operating at 50 barg.

The dilution fluid is supplied by pump 10 and the flow of the dilution fluid is measured by flowmeter 11. Valves 13 and 12 may be adjusted to direct a portion of the flow of dilution fluid to jetting pipe 14 to assist in the formation of a sand slurry if required. In operation pump 10 is controlled by a flow controller 15 so that the flow measured at flowmeter 11 is maintained slightly lower than the flow measured at flowmeter 6. In this example the flow at flowmeter 6 is 3.25 m$^3$/h and the flow at flowmeter 11 is 3.0 m$^3$/h. By this means a net flow of 0.25 m$^3$/h, which is the difference between the flows at flowmeters 6 and 11, is drawn from the underflow compartment 2 of desander vessel 1. This flow of 0.25 m$^3$/h is diluted by 3.0 m$^3$/h of dilution liquid, ie by 12 times its volume. The flowrate of the dilution fluid and the flow drawn from the vessel are chosen so as to reduce the concentration of dissolved gasses contained in the combined flow so that flashing (evolution of dissolved gas) does not occur, or is at least reduced, in the downstream pressure dropping cyclones 5a to 5f.

The dilution fluid may be degassed produced water (produced water which has been depressurised to near atmospheric pressure for sufficient time for its dissolved gas content to approach equilibrium at that pressure), a hydrocarbon liquid which has been "stabilised" to a pressure below that of the receiving vessel which in the drawing is the sand holding vessel 8, or any other liquid which when mixed with the slurry drawn from the underflow compartment will suppress its tendency to flash in the pressure dropping cyclones. The choice of the dilution fluid will be specific to each application, and depend on what fluids are available.

It will be apparent in that pump 21, flow controller 28, flowmeters 22 & 23, sand holding vessel 8, and pressure reducing cyclones 26 or 27 selected by valves 24 or 25 respectively form a second stage of controlled dilution and pressure drop of the sand. Two stages of controlled dilution and pressure drop may be necessary where the fluid drawn out of the underflow compartment 2 of the wellhead desander 1 contains so much dissolved or liquified gas that the required dilution ratio necessary to prevent (or reduce) gas evolution in the pressure dropping cyclones is impractically large. A system which does not otherwise require two stages of controlled dilution and pressure drop may be designed with two stages so that the flows from several wellhead desanders may be combined into a common sand holding vessel operating at an intermediate pressure. This may be beneficial where it is desired to subject the combined sand flow to some operation where the elevated pressure can be utilised, for example in a sand cleaning process or disposing of it into a disposal well.

A means of disposal is shown. When valve 24 is open the sand from the sand holding vessel 8 operating at 50 barg may be disposed of by adding it into the flow going to a produced water disposal well at 40 barg by passing it through another pressure dropping cyclone 26. By the choice of the pressure at which the sand holding vessel 8 is operated the need to increase the pressure of the slurry may be avoided. Valve 25 directs the slurry through pressure dropping cyclones 27a and 27b to an essentially atmospheric pressure storage vessel for times when disposal of the sand into the produced water disposal wells is not available.

As an alternative to using an inline flowmeter, the flow through the pressure dropping cyclones 5a to 5e may be estimated by measuring the pressure differential across them, preferably by measuring the flow across the pressure dropping cyclone operating at the highest inlet pressure as this has the least probability of passing a flashing flow in the event of a process upset.

The pressure dropping cyclones may be fitted with acoustic or an ultrasonic sensor 31 to detect when flashing is occurring, and this may be used to adjust the flowrate of dilution fluid to increase or decrease the dilution ratio to control the flashing. The acoustic or ultrasonic sensor for this purpose would preferably be fitted on the pressure dropping cyclone with the lowest inlet pressure as this will be the first cyclone to experience a flashing flow when the dissolved gas content becomes too high.

The pressure dropping cyclones may be fitted with acoustic or an ultrasonic sensor 32 to detect when gas is entering the pressure dropping cyclone 5a. This indicates that there is no liquid in the underflow compartment 2 because the draw off rate has exceeded the rate that liquids are being discharged into the underflow compartment 2 by the desanding cyclones. In this situation the flowrate of dilution fluid would be increased to reduce the flowrate of fluid drawn out of the underflow compartment 2.

Sand passing through pressure dropping cyclones undergoes an intense scrubbing against other sand particles and the walls of the pressure dropping cyclones. This is normally sufficient to remove any oils from the surface of the sand and pass it into the liquid phase so that the sand itself needs no further cleaning to reach regulatory limits of cleanliness. The second stage of controlled dilution and pressure drop shown will largely separate the water containing the scrubbed off oil from the sand, and form a fresh slurry of the sand with a clean stream of water so that the system shown can discharge a slurry of clean sand in water of a low oil content. It will be clear that a third and further subsequent stages of controlled dilution and pressure drop can be added if necessary to further reduce the concentration of oil in the water with which the sand forms the slurry.

The invention claimed is:

1. A method of delivering sand slurry originating from sand or sand slurry discharged from a vessel (1) at a discharge pressure, wherein the sand or sand slurry is subjected to the following steps before delivery of the sand slurry at a delivery pressure, the delivery pressure being lower than the discharge pressure:
   i) diluting the sand or sand slurry with a dilution fluid,
   ii) passing the diluted sand or sand slurry through at least one pressure reducing cyclone (5a–5f),
   iii) delivering the pressure reduced sand or sand slurry as a slurry at the delivery pressure, and iv) controlling the dilution of the sand or sand slurry so that flashing is reduced.

2. A method according to claim 1, further including a step prior to step iii) of delivering the sand slurry at a pressure lower than the discharge pressure to a separator (7) which removes at least some of the dilution fluid.

3. A method according to claim 1, wherein the vessel (1) includes a desander vessel having an underflow compartment (2), and wherein step i) includes adding the dilution fluid to the sand in the underflow compartment.

4. A method according to claim 1, wherein the ratio of dilution fluid to the sand or sand slurry being discharged is approximately 12:1.

5. A method according to claim 1, wherein the at least one pressure reducing cyclone (5a–5f) reduces the pressure of the sand slurry passing therethrough by about 25% to 30%.

6. A method according to claim 1, wherein the flow rate of the dilution fluid being added to the sand at step i) is lower than the flow rate of the sand slurry prior to its delivery at step iii).

7. A method according to claim 1, further including steps of:
   detecting gas entering one of the at least one pressure reducing cyclone and
   increasing the flow rate of the dilution fluid at step i) if gas is detected.

8. A method according to claim 1, wherein steps i) and ii) are repeated.

9. A method according to claim 1, wherein the dilution fluid comprises one of degassed produced water and a hydrocarbon liquid.

10. A method according to claim 1, wherein the slurry is delivered at step iii) into a holding vessel.

11. A method of delivering sand slurry originating from sand or sand slurry discharged from a vessel (1) at a discharge pressure, wherein the sand or sand slurry is subjected to the following steps before delivery of the sand slurry at a delivery pressure, the delivery pressure being lower than the discharge pressure:
   i) diluting the sand or sand slurry with a dilution fluid,
   ii) passing the diluted sand or sand slurry through at least one pressure reducing cyclone (5a–5f),
   iii) delivering the pressure reduced sand or sand slurry as a slurry at the delivery pressure,
   iv) controlling the dilution of the sand or sand slurry so that flashing is reduced,
   v) detecting flashing within one or more of the at least one pressure reducing cyclone (5a–5f), and
   vi) increasing the flow rate of the dilution fluid at step i) if flashing is detected.

12. Apparatus far delivering sand slurry originating from sand or sand slurry discharged from a vessel (1) at a discharge pressure, the sand slurry being delivered at a delivery pressure lower than the discharge pressure, the apparatus including:
   a diluting device that combines the sand or sand slurry with a dilution fluid,
   at least one pressure reducing cyclone (5a–5f) downstream of the diluting device, and
   a flow controller (15) for controlling the amount of the dilution fluid combined with the sand or sand slurry in the diluting device so that flashing is reduced.

13. Apparatus according to claim 12, wherein the vessel (1) includes a desander vessel having an underflow compartment (2).

14. Apparatus according to claim 12, further including a separator (7) for removing at least some of the dilution fluid combined with the sand or sand slurry.

15. Apparatus according to claim 14, wherein the separator is a hydrocyclone (7).

16. Apparatus according to claim 12, wherein the diluting device includes a pump (10) and a jetting pipe (14).

17. Apparatus according to claim 12, further including:
   a first flowmeter (6) for measuring the flow rate of slurry flowing from an outlet of the at least one pressure reducing cyclone, and
   a second flowmeter (11) for measuring the flow rate of dilution fluid supplied by the diluting device,
   wherein the flow controller (15) controls the flow of the dilution fluid supplied by the diluting device such that the flow rate at the second flowmeter is lower than the flow rate at the first flowmeter.

18. Apparatus according to claim 12, further comprising a flash detector that detects flashing within one or more of the at least one pressure reducing cyclone, and wherein the flow controller controls the flow rate of the dilution fluid in response to the detection of flashing by the flash detector.

* * * * *